(12) United States Patent
Reisch et al.

(10) Patent No.: US 9,856,922 B2
(45) Date of Patent: Jan. 2, 2018

(54) FRICTIONAL SHIFTING ELEMENT FOR A VEHICLE TRANSMISSION

(71) Applicant: ZF Friedrichshafen AG, Friedrichshafen (DE)

(72) Inventors: Matthias Reisch, Ravensburg (DE); Peter Ziemer, Tettnang (DE); Stefan Beck, Eriskirch (DE); Christian Sibla, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/112,051

(22) PCT Filed: Dec. 15, 2014

(86) PCT No.: PCT/EP2014/077708
§ 371 (c)(1),
(2) Date: Jul. 15, 2016

(87) PCT Pub. No.: WO2015/106900
PCT Pub. Date: Jul. 23, 2015

(65) Prior Publication Data
US 2016/0341258 A1  Nov. 24, 2016

(30) Foreign Application Priority Data
Jan. 17, 2014  (DE) .................. 10 2014 200 854

(51) Int. Cl.
*F16D 13/52*  (2006.01)
*F16D 13/64*  (2006.01)
(Continued)

(52) U.S. Cl.
CPC .......... *F16D 13/52* (2013.01); *F16D 13/648* (2013.01); *F16D 13/683* (2013.01); *F16D 13/69* (2013.01)

(58) Field of Classification Search
None
See application file for complete search history.

(56) References Cited

U.S. PATENT DOCUMENTS 529,314 A  * 11/1894  Smith .................. 192/70.11
940,679 A  * 11/1909  Evans .................. F16D 13/683
                                                192/111.7
(Continued)

FOREIGN PATENT DOCUMENTS

DE     10315169  A1   11/2004
DE   102007055151  A1    6/2008
(Continued)

OTHER PUBLICATIONS

German Search Report DE102014200854.9, dated Aug. 7, 2014, (8 pages).
(Continued)

*Primary Examiner* — Mark A Manley
(74) *Attorney, Agent, or Firm* — Dority & Manning, P.A.

(57) ABSTRACT

A frictional shift element for a motor vehicle transmission includes a first frictional element allocated to a first carrier; and a second frictional element allocated to a second carrier. One of the first frictional element or the second frictional element has an annular frictional surface, and the other of the first frictional element or the second frictional element has a corresponding frictional surface with at least one frictional surface that protrudes along a radial direction in an overlapping area.

26 Claims, 8 Drawing Sheets

(51) Int. Cl.
*F16D 13/68* (2006.01)
*F16D 13/69* (2006.01)

(56) References Cited

U.S. PATENT DOCUMENTS

| | | | | |
|---|---|---|---|---|
| 1,320,246 | A * | 10/1919 | Langdon | F16D 13/683 |
| | | | | 188/135 |
| 2,653,692 | A * | 9/1953 | Polomski, Jr. | F16D 13/64 |
| | | | | 192/107 R |
| 3,584,719 | A * | 6/1971 | Upchurch | F16D 13/71 |
| | | | | 192/107 R |
| 4,356,901 | A | 11/1982 | Koehler et al. | |
| 5,439,087 | A | 8/1995 | Umezawa | |
| 6,006,885 | A | 12/1999 | Borgeaud et al. | |
| 6,026,944 | A | 2/2000 | Satou et al. | |
| 9,139,167 | B2 * | 9/2015 | Tokumasu | F16D 13/648 |
| 2004/0195068 | A1 | 10/2004 | Sudau | |
| 2005/0126878 | A1 * | 6/2005 | Samie | F16D 13/64 |
| | | | | 192/113.36 |
| 2008/0199641 | A1 | 8/2008 | Hasegawa et al. | |
| 2011/0290609 | A1 | 12/2011 | Ziemer et al. | |

FOREIGN PATENT DOCUMENTS

| | | |
|---|---|---|
| DE | 102009001101 A1 | 8/2010 |
| DE | 102009027017 A1 | 12/2010 |
| EP | 0945636 A2 | 9/1999 |
| EP | 2136096 A1 | 12/2009 |
| GB | 814992 A | 6/1959 |
| JP | WO2012147539 * | 11/2012 |

OTHER PUBLICATIONS

German Search Report DE102014200854.9, dated Dec. 5, 2014, (7 pages).

Intenrnational Search Report (English Translation) PCT/EP2014/077708, dated Feb. 25, 2015, (2 pages).

* cited by examiner

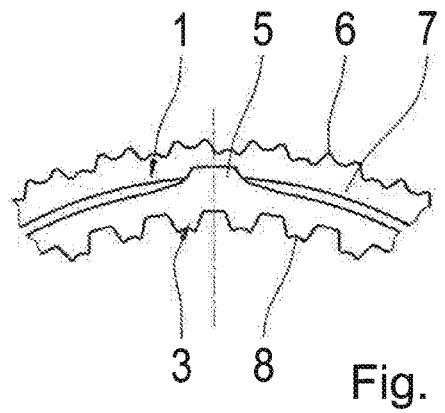
Fig. 5
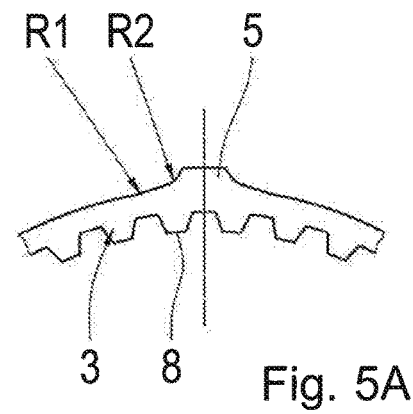
Fig. 5A
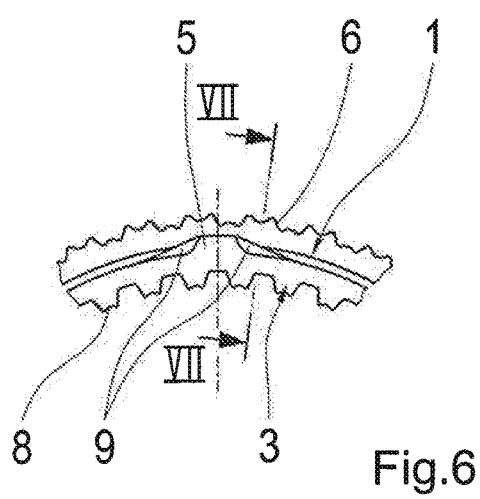
Fig.6
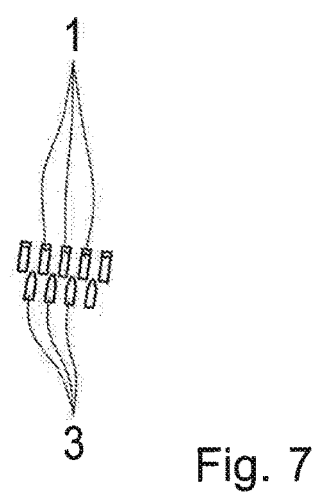
Fig. 7
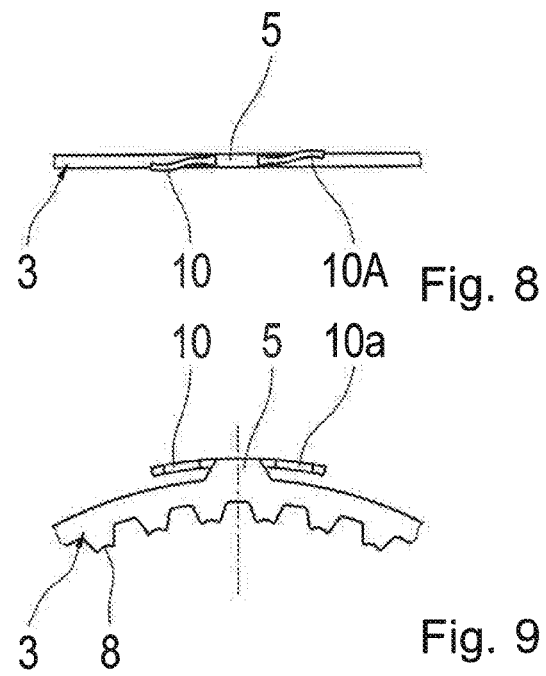
Fig. 8
Fig. 9

FRICTIONAL SHIFTING ELEMENT FOR A VEHICLE TRANSMISSION

FIELD OF THE INVENTION

The present invention relates to a frictional shift element for a transmission of a motor vehicle.

BACKGROUND

For example, a transmission with multiple frictional shift elements for the presentation of different transmission ratios is known from document DE 10 2009 001 101 A1. The frictional shift elements are formed as multi-disk shift elements, whereas the inner multi-disks and the outer multi-disks are designed with cover-free frictional surfaces, in order to increase the permissible surface pressure, such that the shift element has smaller dimensions with the same transfer capacity, and causes lower drag torques in the open mode.

Furthermore, document DE 10 2009 027 017 A1 discloses a multi-disk pack for a multi-disk brake or a multi-disk clutch, with which a spring action is integrated into the multi-disks, such that a desired distancing between the multi-disks is also provided in the open state of the multi-disk pack. This results in a clearance in the entire multi-disk pack.

SUMMARY OF THE INVENTION

Exemplary aspects of the present invention provide a frictional shift element for a transmission of a motor vehicle, which can be manufactured as cost-effectively as possible and causes drag torques that are as low as possible.

A frictional shift element, for example, in multi-disk design or the like, for a transmission, in particular an automatic transmission of a motor vehicle, is proposed. At least one allocated first frictional element is provided to a first carrier, for example an inner multi-disk carrier or an outer multi-disk carrier, and at least one allocated frictional element is provided to a second carrier, for example an outer multi-disk carrier or inner multi-disk carrier, whereas a first frictional element (for example, an inner multi-disk or outer multi-disk), and a second frictional element (for example, an outer multi-disk or inner multi-disk) can be brought into contact as a friction partner with overlapping frictional surfaces for the transfer of torque. Multiple frictional elements form a multi-disk pack, whereas the first and second frictional elements are alternately arranged axially one behind the other, and are pressed against each other through an actuation in the closed state of the frictional shift element, in order to realize the transfer of torque between each of the packs of the first and second frictional elements.

In accordance with exemplary aspects of the invention, it is provided that the first or the second frictional element features a friction surface that is designed to be approximately annular, whereas the other frictional element, as a corresponding frictional surface, features at least one frictional surface element or the like protruding radially in the overlap area.

In this manner, the contact surface and/or the corresponding frictional surfaces between the two frictional elements is/are reduced, by, in the circumferential direction, the frictional surface being repeatedly interrupted through the provision of individual friction lugs or friction teeth on one of the frictional elements, thus either on the first or on the second frictional element. The interruptions in the circumferential direction are realized through, for example, recesses between the provided frictional surface elements or friction lugs or friction teeth, as the case may be. Accordingly, the first and second frictional elements that can be brought into frictional closure with each other, apart from the protruding frictional surface elements, are spaced apart from each other in the radial direction to reduce the overlap area or to reduce the overlapping frictional surfaces. This allows the coolant and/or lubricant, for example oil or the like, to pass through in a radial manner virtually unhindered. Furthermore, the contact surface, in which drag torques are generated through the shearing of the cooling and lubricant, is confined to a minimum.

Preferably, the provided frictional surface element may be shaped in one piece on the respective frictional element. This results in further cost advantages in the manufacturing of the proposed frictional shift element.

Preferably, within the framework of an advantageous exemplary embodiment of the invention, it may be provided that the frictional shift element is designed as a wet-running frictional shift element, with which a fluid, preferably oil, is supplied for lubrication and cooling through the frictional element pack or multi-disk pack in the area of the frictional surfaces.

Preferably, the proposed frictional shift element may be used in automatic transmissions as a switching-off shift element, since, with such shift elements, full power shifts are possible without thermally burdening such frictional shift element. A switching-off shift element is characterized in that the frictional shift element is closed in the lowest gear, is open in the highest gear and, upon the sequential switching of all gear steps, only changes the shifting state one time.

With the proposed shift element, this gives rise to particularly low drag torques, by which the fuel consumption of the motor vehicle is considerably reduced. Furthermore, based on the reduced frictional surfaces, this gives rise to a lower mass and less of a need for installation space along with lower costs of manufacturing. Furthermore, this gives rise to a lower moment of inertia, by which, with the frictional shift element in accordance with the invention, better driving dynamics can be realized in the motor vehicle provided with the transmission.

In accordance with an additional exemplary aspect of the present invention, it is provided that at least one frictional element of the respective adjacent first and second frictional elements at the frictional surfaces turned towards each other are designed to be beveled, conical or axially tapered in the cross-section or in the axial direction, as the case may be. Through the fact that the inner and/or outer frictional elements are designed in a flattened or similar manner, a savings of installation space arises. Furthermore, a greater strength is simultaneously achieved, because the multi-disks or frictional elements are designed to be thicker or stronger in the highly stressed areas. In particular, areas where the toothing is provided on the frictional elements are designed as highly stressed areas. In addition, this gives rise to better heat dissipation, since the frictional surface elements have a larger-area connection to the annular cross-section of each frictional element. This gives rises to a higher thermal capacity. Through the flattening or cone effect, in an advantageous manner, it is also the case that lower axial contact forces are necessary to close the frictional shift element. Furthermore, a lower degree of deformation in the manufacturing of the frictional shift element is required.

An additional exemplary aspect of the invention is that a forced distancing is to be provided with the proposed frictional shift element, by which adjacent frictional elements are held at a distance in the open state, and have no effect in the loaded state, thus with a closed frictional shift element. The forced distancing may be achieved by the fact that, for example, at least one spring clip element springing in the axial direction of the frictional element is provided on at least one frictional surface element in the circumferential direction. Through this forced distancing of the frictional elements in a multi-disk pack, coolant and/or lubricant may flow in a radial manner with low flow resistance. Thus, the shear forces in the intermediate space are lower, and the drag torques are reduced.

The frictional shift may be actuated hydraulically, pneumatically, electromechanically or mechanically. Preferably, the wet-running frictional shift element is hydraulically actuated, since the existing coolant and lubricant can be used as the hydraulic medium. The frictional elements of the proposed frictional shift element may be made of sheet metal, steel or the like. The steel may contain carbon, for example, C15, C60, C75. The frictional elements may be designed to be hardened (for example, nitrocarburized or gas-nitrided). As the coating of the frictional elements, analogously to synchronizations, sintering, molybdenum, carbon or the like (for example) may be provided. Furthermore, at least one of the frictional elements may feature a groove or the like; for example, a parallel groove, a waffle groove or a bottleneck groove analogous to paper linings.

The proposed frictional shift element may be used in a power-shifting transmission. It is also conceivable that the frictional shift element is used in a multi-range transmission or in an electric vehicle drive. Additional possible applications are use as all-wheel decouplings, retarder decouplings, a quick-reversing group and a range group.

The present invention claims, in addition to the prescribed frictional shift element, an automatic transmission for a motor vehicle with a frictional shift element designed in such a manner.

BRIEF DESCRIPTION OF THE DRAWINGS

Exemplary aspects of the present invention are further described below with reference to the drawings. The following is shown:

FIGS. 5 and 5A multiple sectional views of a frictional surface element shaped across multiple radii on an inner multi-disk;

FIGS. 6 and 7 several partial views of the frictional shift element with rib-shaped reinforcements on the frictional surface provided on both sides in the circumferential direction;

FIGS. 8 to 16 various partial views of the frictional shift element with spring clip elements shaped in the circumferential direction on the frictional surface element for the forced distancing from adjacent frictional elements;

DETAILED DESCRIPTION

Figure 1:
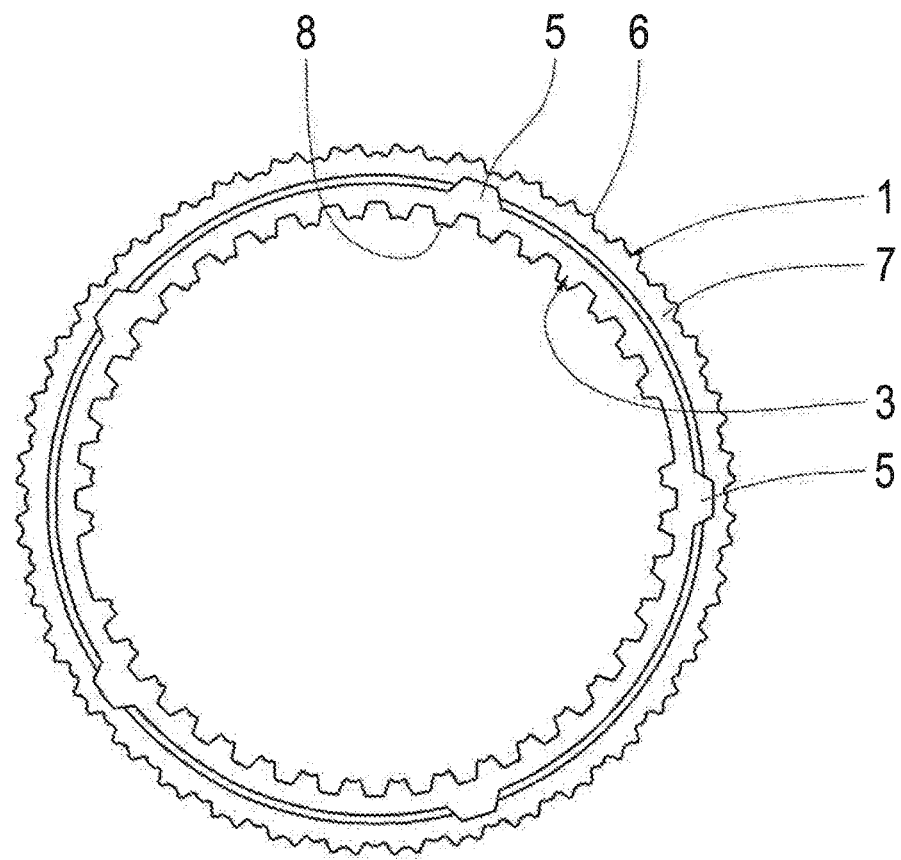
FIGS. 1 and 2 various sectional views of a frictional shift element in accordance with exemplary aspects of the invention with a frictional element designed as an inner multi-disk with multiple frictional surface elements projecting outwards.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 to 27 show various embodiments of the frictional shift element in accordance with exemplary aspects of the invention for a transmission of a motor vehicle, for example as a multi-disk shift element.

The frictional shift element includes multiple first frictional elements 1, which are mounted in a torque-proof manner on a first carrier 2 and multiple second frictional elements 3, which are rotatably mounted on a second carrier 4. The first and second frictional elements 1, 3 are alternately arranged one behind the other as a multi-disk pack, such that overlapping frictional surfaces arise between a first frictional element 1 and a second frictional element 2. For the transfer of torque, the frictional elements 1 and 3 are pressed together axially.

Each of the first or second frictional elements 1, 3 features a frictional surface that is designed to be approximately annular, whereas each of the other frictional elements 1, 3 features, as corresponding frictional surfaces, multiple frictional surface elements 5 protruding radially in the overlap area.

Figure 2:
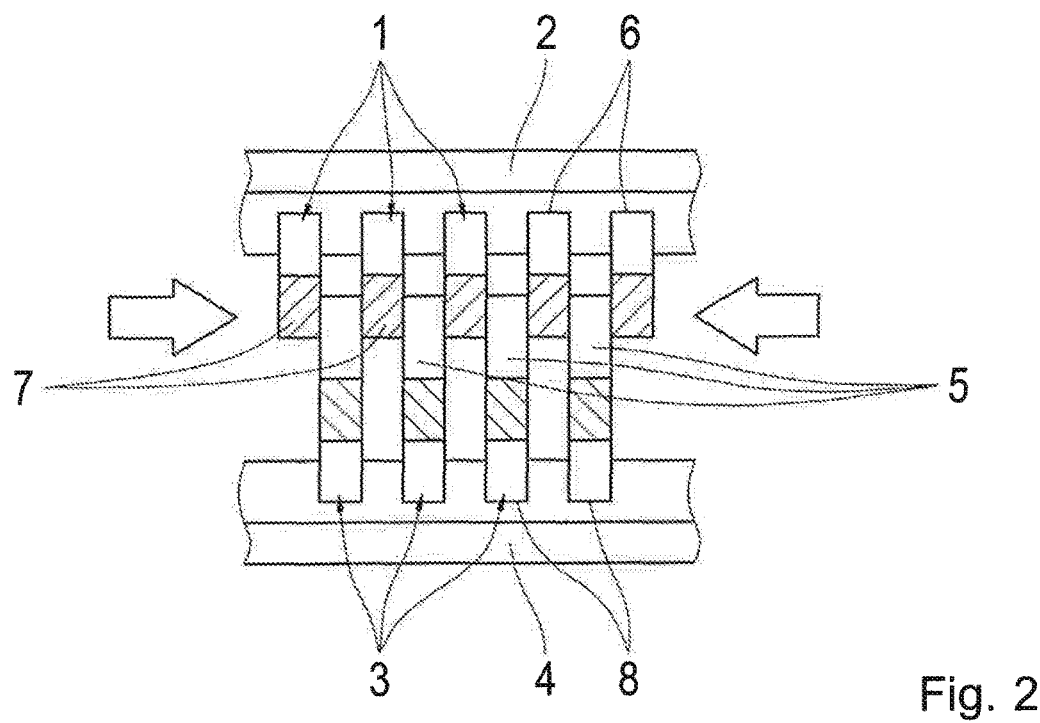

In FIGS. 1 and 2, an exemplary embodiment is provided, with which the first frictional elements 1 are designed as outer multi-disks and the second frictional elements 3 are designed as inner multi-disks, whereas each outer multi-disk that is designed to be approximately annular features an outer toothing 6 for connecting to the outer multi-disk carrier 2 and an approximately annular frictional surface 7. The inner multi-disk, thus the second frictional element 3, features an inner toothing 8 for connecting to the inner multi-disk carrier 4 and multiple frictional surface elements 5 radially distributed across the circumference and protruding outwardly and located in the overlap with the annular frictional surface 7 of the outer multi-disk.

Figure 3:
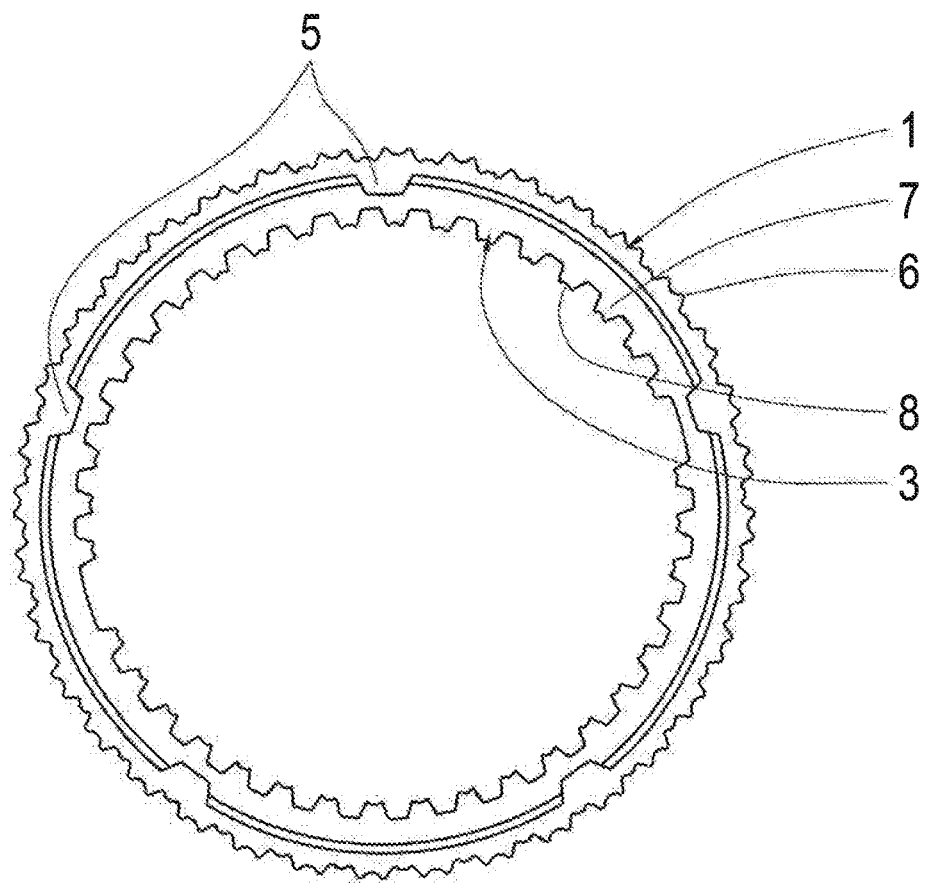
FIGS. 3 and 4 multiple sectional views of the frictional shift element with a frictional element designed as an outer multi-disk with multiple frictional surface elements projecting radially inwards.
Figure 4:
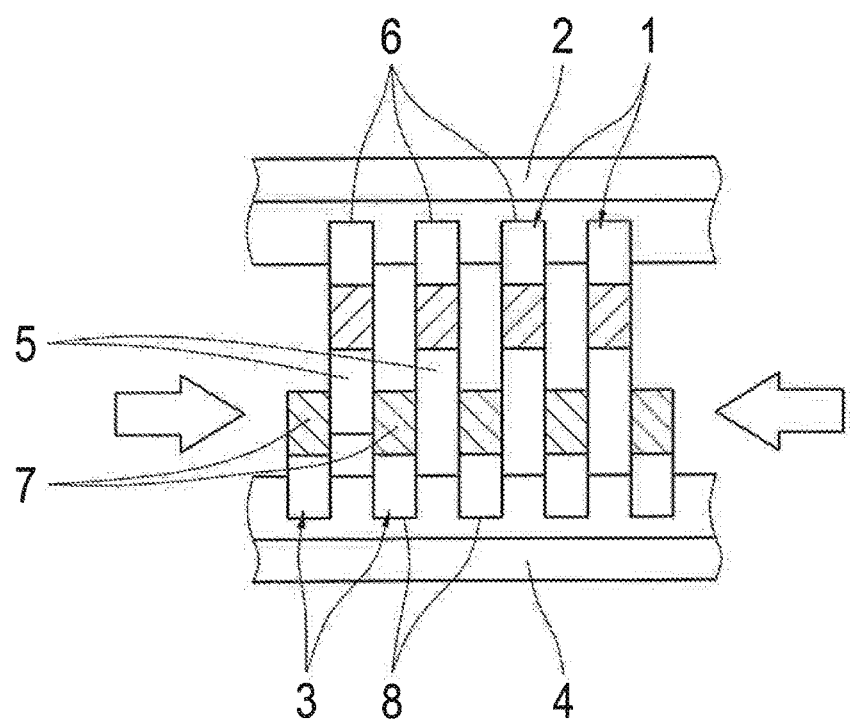
Figure 10:
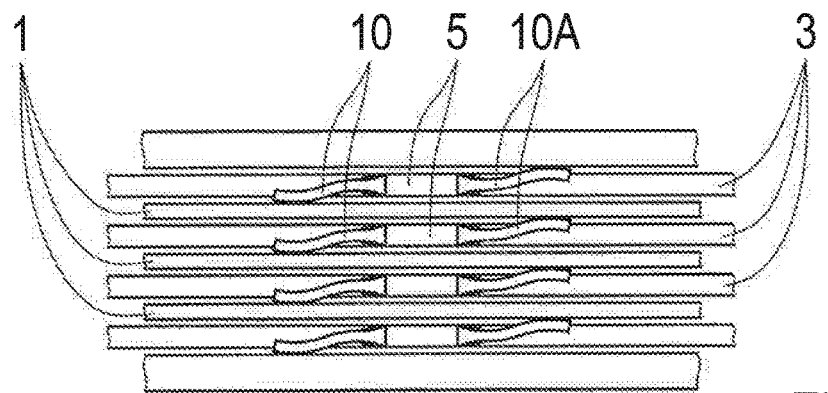
Figure 11:
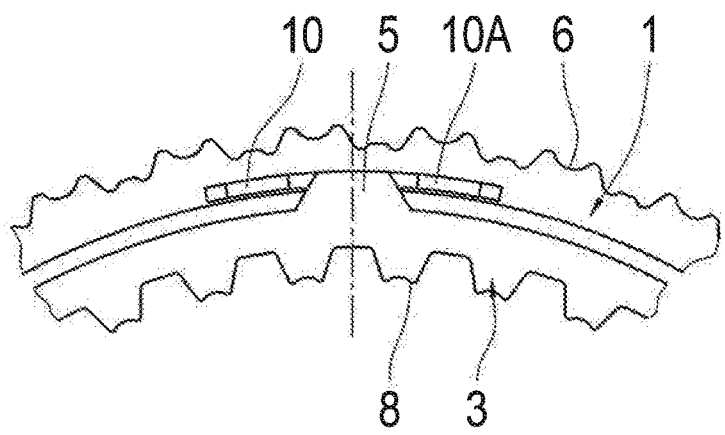
Figure 12:
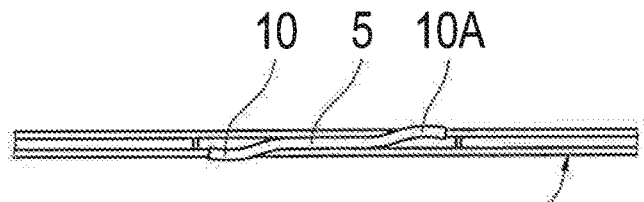

With the exemplary embodiment shown in FIGS. 3 and 4, in contrast to the exemplary embodiment shown in FIGS. 1 and 2, the frictional surface element 5 is provided on the first frictional elements 1 provided as outer multi-disks and the annular frictional surface 7 is provided on the second frictional elements 3 designed as inner multi-disks. The frictional surface elements 5 are arranged in a manner radially distributed across the circumference and protruding inwardly, and in the overlap with the annular frictional surface 7. The arrows to the multi-disk pack shown in FIGS. 2 and 4 illustrate the axial forces for closing the frictional shift element in accordance with the invention.

Independent of the two exemplary embodiments in accordance with FIGS. 1 to 4, it is provided that the first and second frictional elements 1, 3, which can be brought into connection with each other, apart from the protruding frictional surface elements 5, are spaced from each other in the radial direction.

The frictional surface elements 5 are shaped as one piece on the first or second frictional elements 1, 3, such that, in the circumferential direction, several separate tooth-shaped frictional surfaces or contact surfaces are provided; in the closed state of the frictional shift element, these can be brought into contact with the approximately annular frictional surface 7. The frictional surface elements 5 can be optimized with respect to length and width ratio, angle, edge shape and surface structure, in order to create a frictional shift element that can be manufactured as cost-effectively as possible and features low drag torque.

FIGS. 5 and 5A show detailed views of the frictional surface element 5 shaped on the base body of the second frictional element 3 based on the exemplary embodiment in accordance with FIGS. 1 and 2. In order to increase the mechanical strength of the frictional element 3 designed in one piece with the frictional surface element 5, it is provided that the annular cross-section is enlarged in the direction of the frictional surface element 5. This means that, with the version shown in FIGS. 5 and 5A, the outer circumference of the approximately annular frictional element 3 is enlarged in the area of the shaped frictional surface element 5. In FIG. 5A, the tooth-shaped frictional surface element 5 is shaped on the annular frictional element 3 through different radii R1, R2 located one behind the other. The radius in the area of the outer circumference of the annular base body of the frictional element 3 is larger than it is at the end of the tooth-shaped frictional surface of the frictional surface element 5. In this manner, the passage of the protruding frictional surface element 5 at the base body is optimized with respect to its stress curve. The annular cross-section is enlarged in the direction of the frictional surface element 5, by which the multi-disk pack may be constructed more radially compact as a whole. Accordingly, upon the transfer of power, the frictional surface element 5 introduces a bending moment in the annular geometry. In order to favorably design the stress curve resulting from this on the frictional element 3, it is sensible to begin the curvature starting from the annular geometry initially with a larger radius R1 (long arrow) and continue with a smaller radius R2 (short arrow) in the direction of the frictional surface element 5. The geometry curve or radii curve on the frictional surface element 5 can be presented differently on both sides of the friction tooth and/or the frictional surface element 5 (preferred direction of rotation).

FIG. 6 shows a partial side view of the frictional shift element, whereas a view cut along the section line VII-VII is shown in FIG. 7. With the presented version, in the circumferential direction on both sides, a rib-shaped reinforcement 9 is shaped on the frictional surface element 5. Thus, an area with reduced multi-disk width or thickness is located adjacent to the area of the outwardly protruding frictional surface element 5, in order to achieve an increase in strength without enlarging the frictional surface of the frictional surface element 5. The reduced multi-disk width may be produced through forming technology, for example, as a bevel in addition to the actual frictional surfaces of frictional surface element 5. The rib that is thereby formed mechanically supports the frictional surface element 5. Through this gain in strength, the multi-disk pack may also be designed more compactly. This is also cost-effective and increases the material strength or strain hardening.

FIG. 8 shows a top view of a frictional element 1, 3 provided with the frictional surface element 5, whereas, in the circumferential direction on both sides of the frictional surface element 5, in each case, a spring clip element 10 or 10A is provided for forced distancing.

As can be seen in particular from FIGS. 8, 10, 12 to 15, the spring clip elements 10, 10A are designed to be springing in the axial direction of the respective frictional element 1, 3, and, in the unactuated state of the frictional shift element, project in the axial direction from the frictional surfaces of the frictional element 1 or 3. Preferably, the spring clip elements 10, 10A are designed in one piece with the frictional surface element 5, as is shown in particular from FIGS. 9, 11, 14 and 16.

Preferably, the spring clip elements 10, 10A are arranged in a projecting manner at each frictional surface element 5 in the axial direction opposite from the respective frictional element 1, 3. With one multi-disk pack consisting of multiple frictional elements 1, 3, as in particular shown in FIGS. 10 and 15, the spring clip elements 10, 10A act on a frictional element 1 or 3, as the case may be, axially opposite to adjacent frictional elements 1 or 3, as the case may be, of the same multi-disk carrier 2 or 4, as the case may be. The frictional shift element is open in FIGS. 10 and 15; that is, the multi-disks or frictional elements 1, 3, as the case may be, are in a released state. It is evident how the spring clip elements 10, 10A hold adjacent frictional elements 1 at a distance. Through this secured spacing, the cooling and lubricating oil flowing through the intermediate space is less sheared, and thereby produces lower drag torques.

Regardless of the respective versions of the spring clip elements 10, 10A, adjacent frictional elements 1, 3 are held at a distance. In the loaded state, thus in the closed state of the frictional shift element, the spring clip elements 10, 10A are pushed together or away, as the case may be, and the actual frictional surfaces come into contact. In order to ensure a particularly good functioning of the forced distancing, it is expedient to design the spring clip elements 10, 10A thinner than the frictional elements 1, 3 or frictional surface elements 5, as the case may be. Ideally, a multiple number of such spring clip elements 10, 10A is arranged in a manner distributed over the circumference, in order to achieve a proper separation of the frictional elements 1, 3 in the released state. The spring clip elements 10, 10A need not necessarily, as shown here, be fixed to the frictional surface elements 5. Moreover, tappets or the like specifically for receiving the spring clip elements 10, 10A can be used. In this case, the receiver for the spring clip elements 10, 10A is also thinner than the rest of the frictional element 1, 3.

The clearance provided in the design of the entire multi-disk pack may be greater than the sum of the spring deflections of the individual frictional elements 1, 3. This means, with an open frictional shift element, the spring clip elements 10, 10A may also be quite lifted; that is, they need not necessarily rub. This is particularly relevant if the spring clip elements 10, 10A act under a differential rotational speed, thus on frictional elements 1, 3 of different carriers 2, 4.

Figure 13:
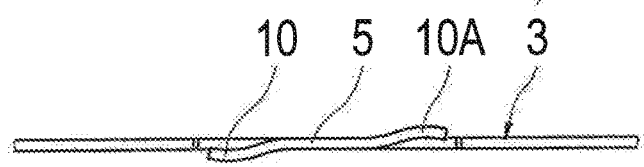
Figure 14:
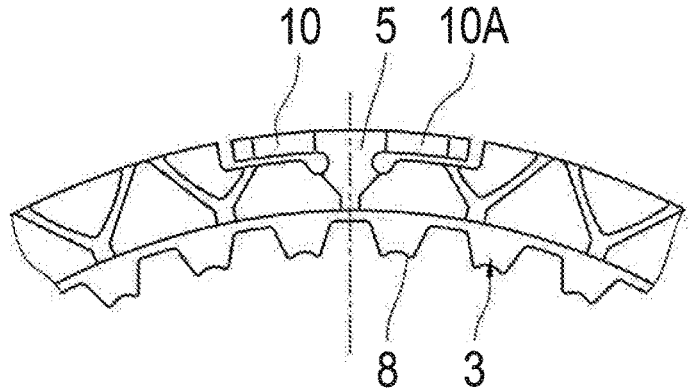
Figure 15:
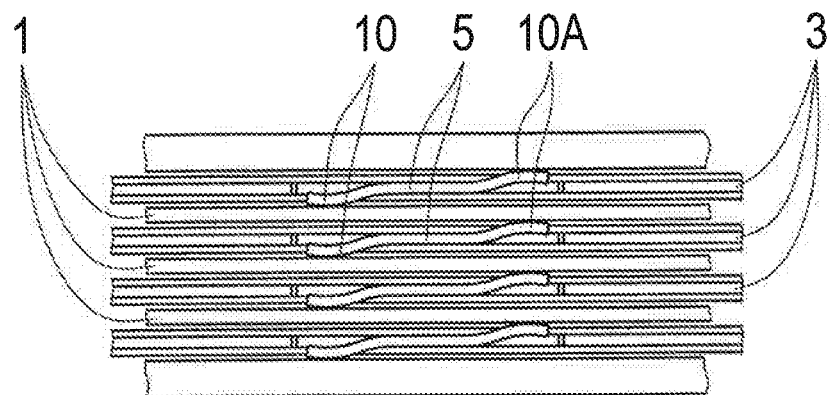
Figure 16:
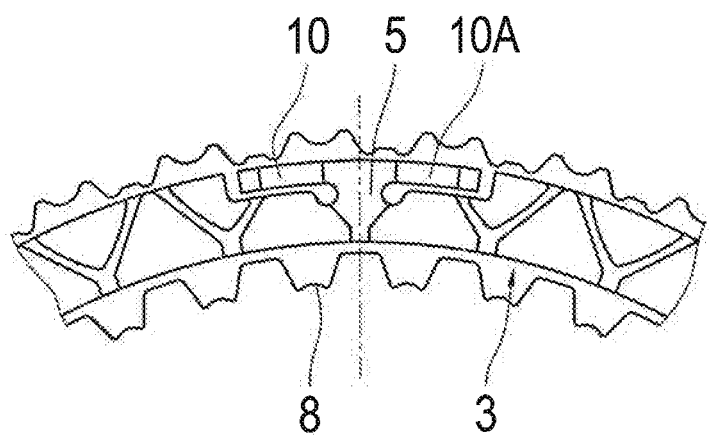

For example, in FIGS. 12, 14, 15 and 16, the frictional element 3 is shown as a lining disk with a friction lining, for example, a paper lining or the like. By contrast, FIG. 13 shows the frictional element 3 without a friction lining.

Figure 17:
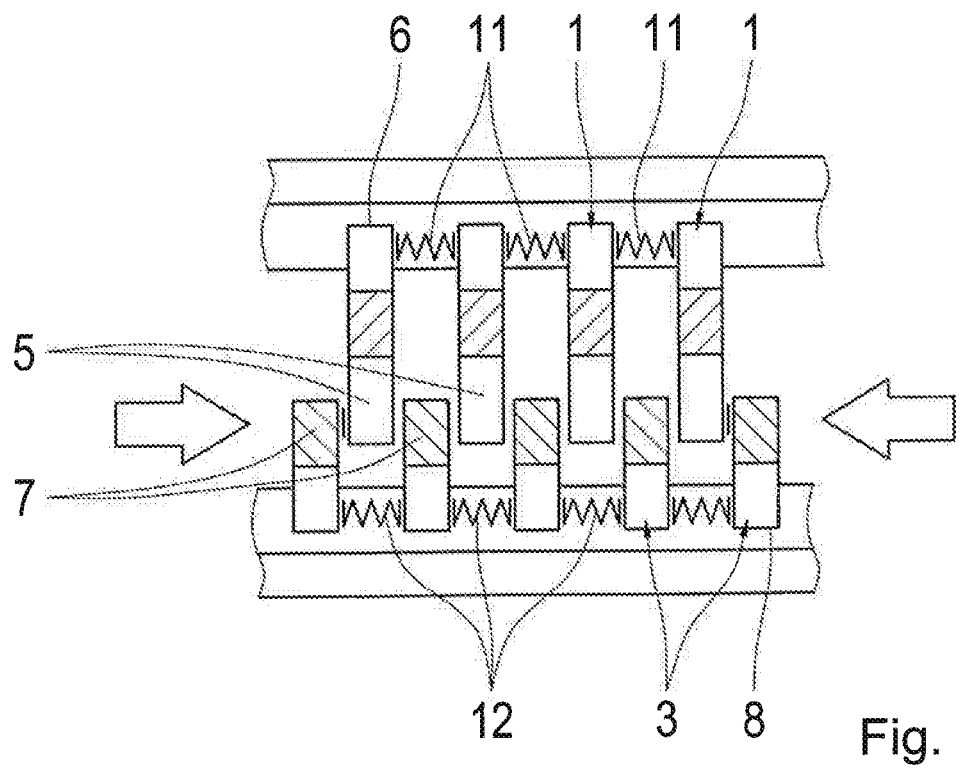
FIG. 17 a schematic view of the frictional shift element as a multi-disk pack with frictional elements forced-distanced in the area of the respective toothing through spring elements.

An additional option of forced distancing is shown in FIG. 17. With this version, the frictional elements 1, 3 of the same multi-disk carrier 2, 4 are forcibly distanced in the area of the respective toothing 6, 8 through individual spring elements 11, 12, whereas the spring elements 11, 12 are only indicated, but may not only be springs; rather, they may be designed as spring plates or the like. The spring elements 11, 12 act on multi-disks or frictional elements 1, 3, as the case may be, which are allocated, for example, to the same multi-disk carrier 2, 4. Thus, a differential rotational speed does not apply between the frictional elements 1, 3. With the use of the spring elements 11, 12, the frictional elements 1, 3 of each carrier 2, 4 are distanced among each other, and the frictional elements 1, 3 of the different carriers 2, 4 are spaced from each other only at two friction points. In this manner, it is ensured that a defined air gap is provided, and only negligibly small drag torques arise in the open state of the shift element. Thus, with the version shown in FIG. 17, the multi-disk pack consisting of inner multi-disks and outer multi-disks is aligned centrally to one another.

FIGS. 18 to 21 show various versions of the frictional shift element, through which a greater mechanical strength and a savings of axial installation space are enabled. Furthermore, a better heat dissipation and a lower axial contact force are achieved and, in addition, a lesser degree of deformation of the frictional elements 1, 3 upon manufacturing is enabled.

Figure 18:
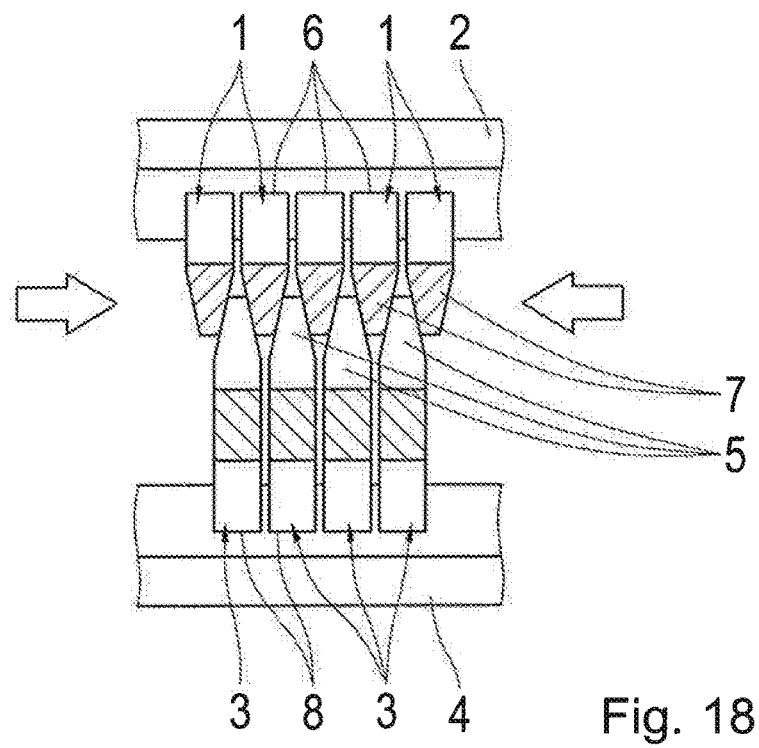
FIG. 18 a schematic view of the frictional shift element as a multi-disk pack with frictional elements that are beveled at the corresponding frictional surfaces and thus cone-shaped.

FIG. 18 shows a frictional shift element, with which the respective adjacent first and second frictional elements 1, 3 at the frictional surfaces turned towards each other are designed to be beveled or conical in the cross-section. In particular, because of the cone effect, lower axial contact forces are required. With this version, the axial tapering of the frictional surface element 5 and the frictional surfaces 7 are symmetrical. An asymmetrical or one-sided flattening is also possible.

Figure 19:
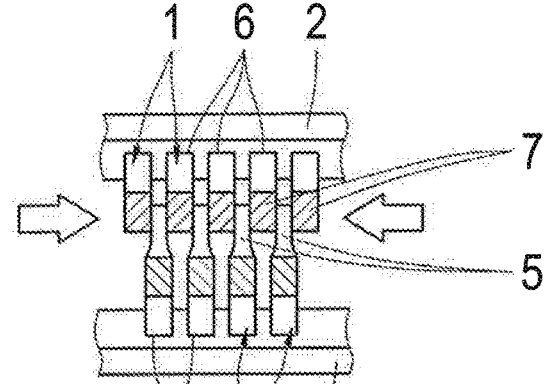
FIG. 19 a schematic view of the frictional shift element as a multi-disk pack with frictional elements featuring a smaller axial thickness in the area of the frictional surface elements.

FIG. 19 shows a frictional shift element, with which, in the axial direction, the frictional surface element 5 features a smaller thickness than it has in the area of the toothing 8 of the second frictional element 3. With this version, the tapering of the frictional surface element 5 is symmetrical. An asymmetrical or one-sided flattening is also possible.

Figure 20:
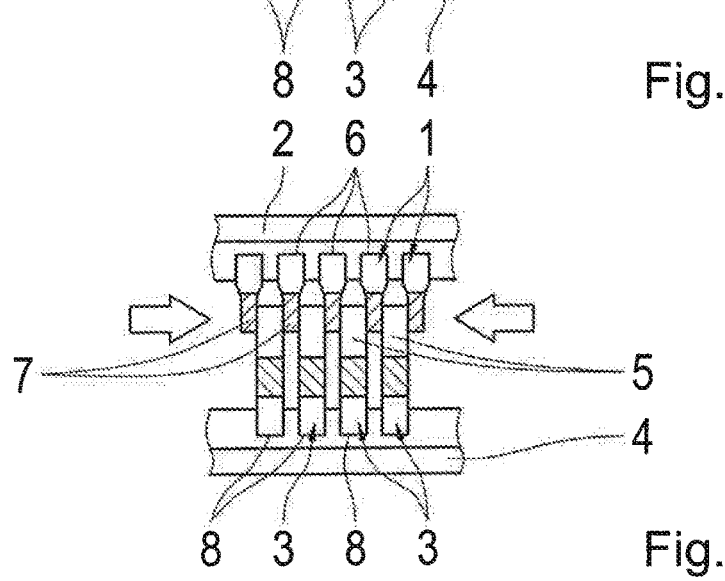
FIG. 20 a schematic view of the frictional shift element as a multi-disk pack with frictional elements featuring a smaller axial thickness in the area of the annular frictional surfaces.

FIG. 20 shows the frictional shift element with which the first frictional elements 1 in the area of the annular frictional surfaces 7, feature, in the axial direction, a smaller thickness than it does in the area of the toothing 6, whereas the frictional surface elements 5 are designed with respect to their thickness without any change. With this version, the tapering of the annular frictional surfaces 7 is designed to be symmetrical. It is also possible that an asymmetrical or one-sided flattening is provided.

Figure 21:
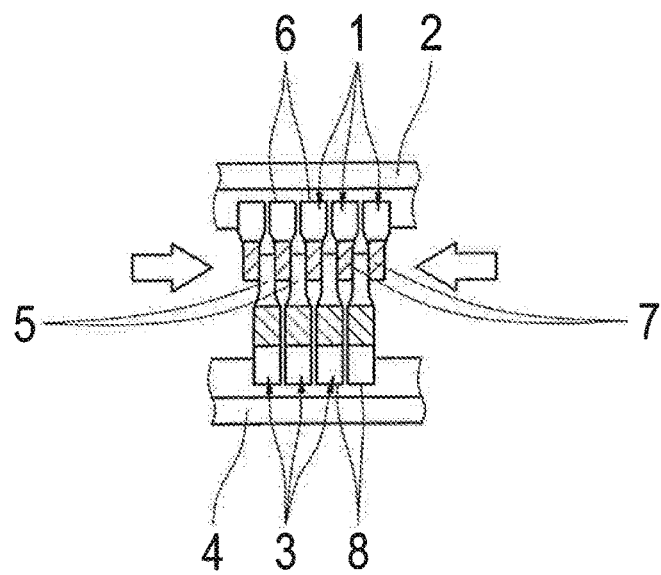
FIG. 21 a schematic view of the frictional shift element as a multi-disk pack with frictional elements featuring a smaller axial thickness in the area of the annular frictional surfaces and in the area of the frictional surface element.

FIG. 21 shows a version in which the versions shown in FIGS. 19 and 20 are combined.

Figure 22:
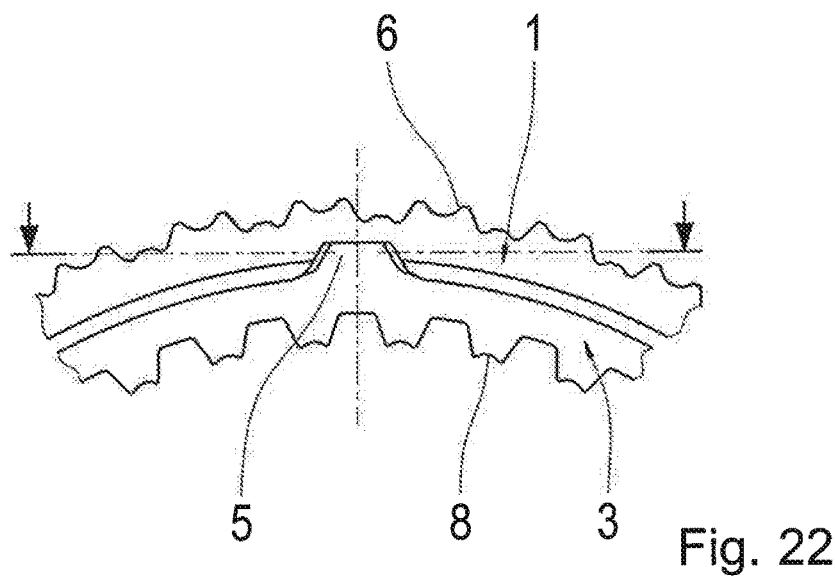
FIGS. 22 and 23 multiple detailed views of the frictional shift element with frictional surface elements featuring chamfers or radii in the circumferential direction in the inlet and outlet areas.
Figure 23:
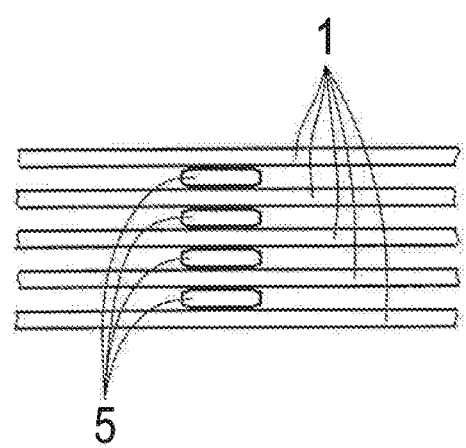

FIGS. 22 and 23 show various detailed views of the frictional shift elements, with which chamfers or radii, as the case may be, are provided for the frictional surface element 5 in the circumferential direction. Thus, the frictional surface elements 5 or friction teeth, as the case may be, have chamfers or radii in their inlet and outlet areas, in order to protect the adjacent frictional element. This prevents the frictional surface element 5 from gliding in a machined manner across the friction partner as a kind of a turning tool or lathe chisel. In addition, drag torques may also be reduced through this.

Figure 24:
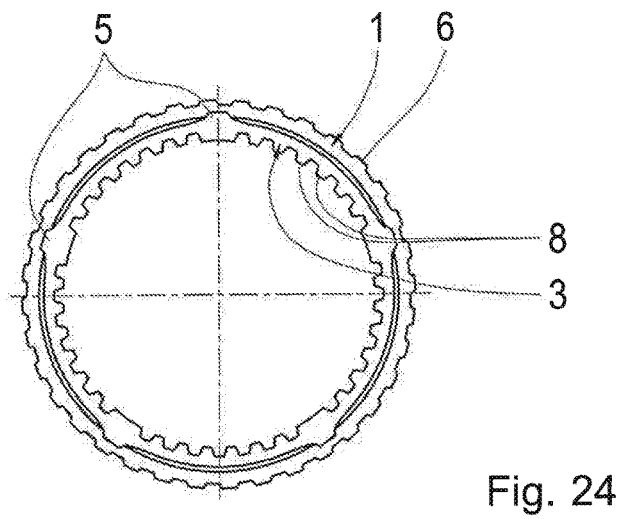
FIG. 24 a schematic view of the frictional shift element as a multi-disk pack with frictional elements mounted on a common carrier with frictional surface elements arranged in the axial direction congruently one behind the other.

FIG. 24 shows the proposed frictional shift element with an assembly aid, with which it is provided that the frictional surface elements 5 are arranged at the frictional elements 3 of the inner multi-disk carrier 4 in the axial direction congruently one behind the other. Upon the assembly of the frictional elements 1 or 3, as the case may be, it is essential to ensure that the frictional surface elements 5 or teeth, as the case may be, are one behind the other. For this reason, the frictional elements 1, 3 have toothings 6, 8 with different geometries for individual teeth or tooth gaps. An assembly device corresponding to the toothing 3 may now ensure the assembly in a desired rotational position. In this illustration, the frictional elements 1, 3 are also designed to be reverse symmetrical. Reverse symmetrical means that, upon the assembly, which side is pointing upwards and which side is pointing downwards is irrelevant. This reduces the possibility of improper assembly.

Within the toothing 6, 8, different geometries, such as (for example) different tooth widths and/or different tooth gap widths and/or different tooth angles are provided, in order to, in combination with a corresponding carrier 2, 4, force an assembly with frictional surface elements 5 arranged in the axial direction in a manner congruent through each other.

Figure 25:
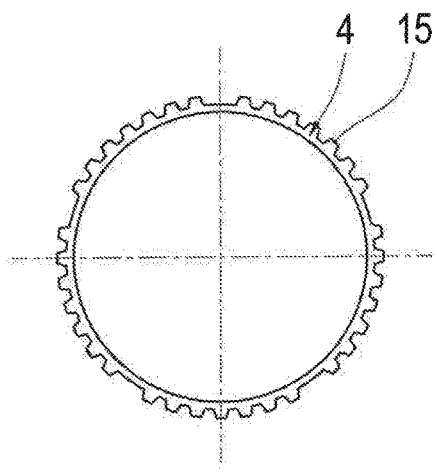
FIG. 25 a schematic view of the inner multi-disk carrier receiving an inner frictional element shown in FIG. 24 in a torque-proof manner with adjusted and, FIGS. 26 and 27 various partial schematic sectional views of the frictional shift element as a multi-disk pack with a support element provided at the end of the multi-disk pack and spaced from the center frictional surface radius outwardly in the axial direction.

As shown in FIG. 25, the multi-disk carrier 4 has the geometry for its toothing 15 adjusted to the frictional element 3, such that an assembly with an incorrect angle of rotation can be ruled out.

Figure 26:
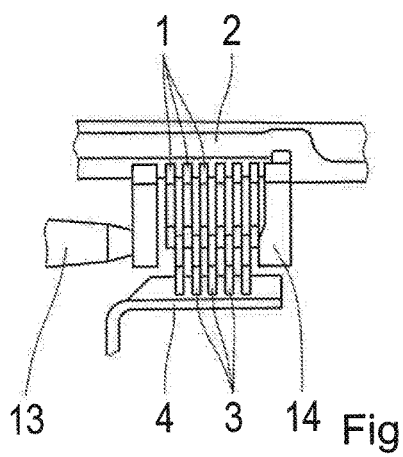
Figure 27:
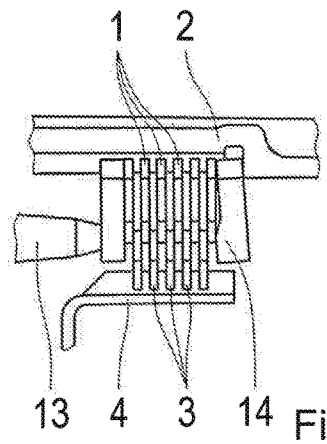

In FIGS. 26 and 27, the proposed frictional shift element is presented with a corresponding multi-disk pack, consisting of the first frictional elements 1 and second frictional elements 3, whereas the multi-disk pack is released or open, as the case may be, in FIG. 26 and is closed or shifted, as case may be, in FIG. 27. The piston 13 for actuating the frictional shift element and for applying the necessary axial force is correspondingly actuated, such that the axial force is applied to the multi-disk pack. The force is guided through the multi-disk pack and is led back to the last frictional element 1 in the multi-disk carrier 2. Thereby, the last frictional element 1 is formed as a disk. In order to independently achieve from the disks an even wear pattern on the frictional surfaces, it is proposed that at least one support element 14 is arranged at the beginning and/or end of the frictional element pack or multi-disk pack (in the presentation in accordance with FIGS. 26 and 27, at the end) and is spaced in the axial direction from the center frictional surface radius of the corresponding frictional surfaces of the frictional elements outwardly or inwardly (in the versions shown, outwardly).

Modifications and variations can be made to the embodiments illustrated or described herein without departing from the scope and spirit of the invention as set forth in the appended claims.

REFERENCE SIGNS

1 First frictional element or multi-disk
2 First carrier
3 Second frictional element or multi-disk
4 Second carrier
5 Frictional surface element
6 Toothing of a first frictional element
7 Annular frictional surface
8 Toothing of a second frictional element
9 Rib-shaped reinforcement
10,10A Spring clip element
11 Spring element
12 Spring element
13 Piston
14 Support element
15 Toothing of a second carrier
R1,R2 Radius

The invention claimed is:

1. A frictional shift element for a motor vehicle transmission, comprising:
a first metal frictional element allocated to a first carrier; and
a second metal frictional element allocated to a second carrier, the second metal frictional element being a friction partner for the first metal frictional element, the second metal frictional element contactable with the first metal frictional element for torque transfer at an overlapping area between the first and second metal frictional elements,
wherein one of the first metal frictional element or the second metal frictional element has an annular metal frictional surface,
wherein the other of the first metal frictional element or the second metal frictional element has a corresponding metal frictional surface with a plurality of frictional surfaces, each friction surface of the plurality of frictional surfaces protruding along a radial direction into the overlapping area, the frictional surfaces of the plurality of frictional surfaces distributed over a circumference of an approximately annular base body of the other of the first metal frictional element or the second metal frictional element,
wherein the frictional surfaces of the plurality of frictional surfaces are formed as one piece with the other of the first metal frictional element or the second metal frictional element, and
wherein the first and second metal frictional elements, except for the overlapping area between the first and second metal frictional elements, are spaced from each other in the radial direction such that coolant, lubricant, or both coolant and lubricant is flowable along the radial direction between the first and second metal frictional elements.

2. The frictional shift element of claim 1, wherein the first metal frictional element is an outer multi-disk and the second metal frictional element is an inner multi-disk, the first carrier being an outer multi-disk carrier and the second being an inner multi-disk carrier, the outer multi-disk having an outer toothing for connecting to the outer multi-disk carrier, the outer multi-disk also having the annular frictional surface, the inner multi-disk having an inner toothing for connecting to the inner multi-disk carrier, the inner multi-disk also having the plurality of frictional surfaces, the frictional surfaces of the plurality of frictional surfaces distributed over the circumference of the inner multi-disk, the frictional surfaces of the plurality of frictional surfaces also protruding outwardly along the radial direction and positioned to overlap with the annular frictional surface of the outer multi-disk, the frictional surfaces of the plurality of frictional surfaces spaced apart along the circumference of the outer multi-disk.

3. The frictional shift element of claim 1, wherein the first element is an outer multi-disk and the second metal frictional element is an inner multi-disk, the first carrier being an outer multi-disk carrier and the second being an inner multi-disk carrier, the inner multi-disk having the annular frictional surface, the inner multi-disk also having an inner toothing for connecting to the inner multi-disk carrier, the outer multi-disk having an outer toothing for connecting to the outer multi-disk carrier, the outer multi-disk also having the plurality of frictional surfaces, the frictional surfaces of the plurality of frictional surfaces distributed over the circumference of the inner multi-disk, the frictional surfaces of the plurality of frictional surfaces also protruding inwardly along the radial direction and positioned to overlap with the annular frictional surface of the inner multi-disk, the frictional surfaces of the plurality of frictional surfaces spaced apart along the circumference of the inner multi-disk.

4. The frictional shift element of claim 1, wherein each frictional surface of the plurality of frictional surfaces is tooth-shaped at the approximately annual base body of the other of the first metal frictional element or the second metal frictional element.

5. The frictional shift element of claim 4, wherein each tooth-shaped frictional surfaces of the plurality of frictional surfaces is shaped across a plurality of consecutive radii along a circumferential direction.

6. The frictional shift element of claim 5, wherein a first radius of plurality of consecutive radii proximate an inner or outer circumference of the annual base body is larger than a second radius of plurality of consecutive radii proximate the tooth-shaped frictional surfaces.

7. The frictional shift element of claim 1, wherein a rib-shaped reinforcement is formed on both sides of each of the plurality of frictional surfaces along a circumferential direction, the rib-shaped reinforcement extending along the circumferential direction.

8. The frictional shift element of claim 1, wherein a spring clip element is compressed along an axial direction at one or more of the plurality of frictional surfaces such that the spring clip element urges the first and second metal frictional elements apart along the axial direction in an unactuated state of the frictional shift element.

9. The frictional shift element of claim 8, wherein the spring clip element is formed as one piece with the plurality of frictional surfaces.

10. The frictional shift element of claim 8, wherein the spring clip element is positioned on both sides of the one or more of the plurality of frictional surfaces along a circumferential direction.

11. The frictional shift element of claim 10, wherein the spring clip element projects in the axial direction from the one or more of the plurality of frictional surfaces.

12. The frictional shift element of claim 11, wherein the spring clip element acts on the one of the first metal frictional element or the second metal frictional element.

13. The frictional shift element of claim 1, wherein frictional elements of the first carrier are urged apart proximate toothing of the first carrier and friction elements of the second carrier are also urged apart proximate toothing of the second carrier by a plurality of spring elements.

14. The frictional shift element of claim 1, wherein the annular frictional surface and the plurality of frictional surfaces are turned towards each other and are beveled or conical in an axial direction.

15. The frictional shift element of claim 1, wherein a thickness of the plurality of frictional surfaces along an axial direction is smaller than a thickness of the other of the first metal frictional element or the second metal frictional element proximate toothing of the other of the first metal frictional element or the second metal frictional element.

16. The frictional shift element of claim 1, wherein a thickness of the annular frictional surface along an axial direction is smaller than a thickness of the one of the first metal frictional element or the second metal frictional element proximate toothing of the one of the first metal frictional element or the second metal frictional element.

17. The frictional shift element of claim 1, wherein chamfers or radii are provided for the plurality of frictional surfaces in a circumferential direction.

18. The frictional shift element of claim 1, wherein the first metal frictional element is at least one first metal frictional element and the second metal frictional element is at least one second metal frictional element, each frictional surface of the one of the at least one first metal frictional element or the at least one second metal frictional element arranged in an axial direction in a manner congruently one behind the other.

19. The frictional shift element of claim 1, wherein within toothing of the first and second metal frictional elements, teeth of the toothing of the first and second metal frictional elements have at least one of different tooth widths, different tooth gap widths or different tooth angles.

20. The frictional shift element of claim 1, wherein each frictional element of the first and second metal frictional elements are reverse symmetrical.

21. The frictional shift element of claim 1, wherein:
a multi-disk pack includes the first and second metal frictional elements;
a support element is arranged at a beginning of the multi-disk pack, an end of the multi-disk pack, or both the beginning and the end of the multi-disk pack; and
the support element is spaced in an axial direction from a center frictional surface radius of the annular frictional surface and the plurality of frictional surfaces of the multi-disk pack.

22. The frictional shift element of claim 1, wherein the frictional shift element is a wet-running frictional shift element.

23. The frictional shift element of claim 1, wherein at least one of the first and second metal frictional elements feature a groove proximate the plurality of frictional surfaces, proximate of the annular frictional surface, or proximate both the plurality of frictional surfaces and the annular frictional surface.

24. The frictional shift element of claim 1, wherein the first and second metal frictional elements comprise hardened steel, nitrocarburized steel, or both hardened steel and nitrocarburized steel.

25. The frictional shift element of claim 1, wherein the frictional shift element is a switching-off shift element in an automatic transmission.

26. A frictional shift element for a motor vehicle transmission, comprising:
a first metal frictional element allocated to a first carrier; and
a second metal frictional element allocated to a second carrier, the second metal frictional element being a friction partner for the first metal frictional element, the second metal frictional element contactable with the first metal frictional element for torque transfer at an overlapping area between the first and second metal frictional elements,
wherein one of the first metal frictional element or the second metal frictional element has an annular metal frictional surface,
wherein the other of the first metal frictional element or the second metal frictional element has a corresponding metal frictional surface with a plurality of frictional surfaces, each friction surface of the plurality of frictional surfaces protruding along a radial direction into the overlapping area, the frictional surfaces of the plurality of frictional surfaces distributed over a circumference of an approximately annular base body of the other of the first metal frictional element or the second metal frictional element,
wherein the frictional surfaces of the plurality of frictional surfaces are formed as one piece with the other of the first metal frictional element or the second metal frictional element,
wherein a spring clip element is compressed along an axial direction at one or more of the plurality of frictional surfaces such that the spring clip element urges the first and second metal frictional elements apart along the axial direction in an unactuated state of the frictional shift element, and
wherein the spring clip element is formed as one piece with the plurality of frictional surfaces.

* * * * *